(12) United States Patent
Wei et al.

(10) Patent No.: US 10,377,194 B2
(45) Date of Patent: Aug. 13, 2019

(54) METHOD OF MODELING TIRE PERFORMANCE

(71) Applicant: Bridgestone Americas Tire Operations, LLC, Nashville, TN (US)

(72) Inventors: Terence Wei, Copley, OH (US); Hans Dorfi, Akron, OH (US); Takeshi Ishida, Tokyo (JP)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 24 days.

(21) Appl. No.: 15/500,938

(22) PCT Filed: Jul. 28, 2015

(86) PCT No.: PCT/US2015/042395
§ 371 (c)(1),
(2) Date: Feb. 1, 2017

(87) PCT Pub. No.: WO2016/022331
PCT Pub. Date: Feb. 11, 2016

(65) Prior Publication Data
US 2017/0217265 A1    Aug. 3, 2017

Related U.S. Application Data

(60) Provisional application No. 62/033,907, filed on Aug. 6, 2014.

(51) Int. Cl.
*B60C 11/00* (2006.01)
*B60C 11/03* (2006.01)
(Continued)

(52) U.S. Cl.
CPC ............ *B60C 99/006* (2013.01); *B60C 11/03* (2013.01); *G01M 17/024* (2013.01);
(Continued)

(58) Field of Classification Search
None
See application file for complete search history.

(56) References Cited

U.S. PATENT DOCUMENTS 5,396,438 A    3/1995    Oblizajek
5,811,672 A    9/1998    Mancosu et al.
(Continued)

FOREIGN PATENT DOCUMENTS

CN    101847270    9/2010
CN    102034013    10/2012
(Continued)

OTHER PUBLICATIONS

Schmid, Markus. "Tire Modeling for Multibody Dynamics Applications" 2011, 76 pages.*
(Continued)

*Primary Examiner* — Saif A Alhija
(74) *Attorney, Agent, or Firm* — Shaun J. Fox; Bryan Jaketic (57) ABSTRACT

A method of modeling a tire includes providing a tire having a first tire design, rotating the tire under a vertical load, and measuring a plurality of forces at a plurality of selected conditions. The method further includes using a computer to plot the plurality of forces against the plurality of conditions, using the computer to plot a plurality of moments against the plurality of conditions, and using the computer to fit a first force curve to the plurality of plotted forces at the plurality of conditions, such that the first force curve is asymmetric. The method also includes using the computer to fit a first moment curve to the plurality of plotted moments at the plurality of conditions, evaluating the first force curve and the first moment curve, and making a second tire design based on the evaluation of the first force curve and the first moment curve.

20 Claims, 7 Drawing Sheets

(51) Int. Cl.
*B60C 99/00* (2006.01)
*G01M 17/02* (2006.01)
*G06F 17/50* (2006.01)

(52) U.S. Cl.
CPC .. *G06F 17/5009* (2013.01); *B60C 2011/0016* (2013.01); *B60C 2011/0033* (2013.01); *G06F 17/50* (2013.01)

(56) References Cited

U.S. PATENT DOCUMENTS

| | | | |
|---|---|---|---|
| 5,899,952 | A | 5/1999 | Fukada |
| 6,134,957 | A | 10/2000 | Fricke et al. |
| 6,266,601 | B1 | 7/2001 | Soga et al. |
| 6,549,842 | B1 | 4/2003 | Hac et al. |
| 6,659,570 | B2 | 12/2003 | Nakamura |
| 6,754,615 | B1 * | 6/2004 | Germann ............... B60C 19/00 701/36 |
| 7,363,805 | B2 | 4/2008 | Jayakumar et al. |
| 8,032,344 | B2 | 10/2011 | Miyamoto |
| 2001/0007965 | A1 | 7/2001 | Yokoyama et al. |
| 2009/0281773 | A1 * | 11/2009 | Coe ..................... B60C 11/01 703/1 |

FOREIGN PATENT DOCUMENTS

| | | |
|---|---|---|
| EP | 1293917 | 7/2005 |
| JP | 2002356106 | 12/2002 |
| JP | 2003118558 | 4/2003 |
| JP | 2006256406 | 9/2006 |
| JP | 2008049725 | 3/2008 |
| JP | 2010156584 | 7/2010 |
| JP | 4554426 | 9/2010 |
| JP | 4710261 | 6/2011 |
| JP | 5064669 | 10/2012 |
| JP | 2013035413 | 2/2013 |

OTHER PUBLICATIONS

International Search Report and Written Opinion; Corresponding PCT Application Serial No. PCT/US2015/042395; Authorized Officer Ji Myong Nho; Nov. 30, 2015.

Kasprzak, Edward M. et al.; Tire Asymmetries and Pressure Variations in the Radt/Milliken Nondimensional Tire Model; Society of Automotive Engineers, Inc.; 2006.

* cited by examiner

METHOD OF MODELING TIRE PERFORMANCE

FIELD OF INVENTION

The present disclosure relates to a method of modeling tire performance. More particularly, the present disclosure relates to a method of making tire force and moment models to reproduce tire behavior in simulation.

BACKGROUND

It is known to test a tire by placing a tire on a test belt or track, and by taking physical measurements as the tire rotates at a selected speed. Such measurements may include a measurement of forces or moments on a tire at various vertical loads. Alternatively, virtual measurements may be made by a computer simulation of a tire rotating under various loads. The physical measurements or virtual measurements may be used to further refine a design of a tire. Where a limited number of measurements are produced, these measurements may be supplemented by extrapolating other values by using a mathematical algorithm or by plotting the measurements on a graph and fitting a line or a curve to the plotted points. Such extrapolations may assume a zero slip angle when the velocity is zero. Such extrapolations may also assume there is no moment when no vertical load is applied. Such extrapolations may also fail to accurately model tire behavior under certain conditions, such as at low speeds.

SUMMARY OF THE INVENTION

In one embodiment, a method of manufacturing a tire includes providing a first tire having a first tire design and rotating the first tire at a first speed under a first selected vertical load. The method further includes measuring a first plurality of forces, including at least one force on the first tire at each of a plurality of selected conditions while the first tire rotates at the first speed under the first selected vertical load. The plurality of selected conditions is selected from the group consisting of a plurality of selected slip angles, a plurality of selected inclination angles, and a plurality of selected longitudinal slip ratios. The method also includes using a computer to plot the first plurality of forces against the plurality of selected conditions and using the computer to fit a first force curve to the first plurality of plotted forces at the plurality of selected conditions. The method further includes rotating the first tire at the first speed under a second selected vertical load and measuring a second plurality of forces, including at least one force on the first tire at each of the plurality of selected conditions while the first tire rotates at the first speed under the second selected vertical load. The method also includes using the computer to plot the second plurality of forces against the plurality of selected conditions and using the computer to fit a second force curve to the second plurality of plotted forces at the plurality of selected conditions. The method further includes evaluating the first force curve and the second force curve, making a second tire design based on the evaluation of the first force curve and the second force curve, and producing a second tire having the second tire design, wherein the producing the second tire includes producing at least one physical tire having the second tire design.

In another embodiment, a method of modeling a tire includes providing a tire having a first tire design and rotating the tire under a vertical load. The method further includes measuring a plurality of forces, including at least one force on the tire at each of a plurality of selected conditions while the tire rotates under the vertical load, and determining a plurality of moments, including at least one moment on the tire at each of the plurality of selected conditions while the tire rotates under the vertical load. The plurality of conditions is selected from the group consisting of a plurality of inclination angles including at least one negative inclination angle and at least one positive inclination angle, a plurality of slip angles including at least one negative slip angle and at least one positive slip angle, and a plurality of longitudinal slip ratios including at least one negative longitudinal slip ratio and at least one positive longitudinal slip ratio. The method further includes using a computer to plot the plurality of forces against the plurality of conditions, using the computer to plot the plurality of moments against the plurality of conditions, and using the computer to fit a first force curve to the plurality of plotted forces at the plurality of conditions, such that the first force curve is asymmetric. The method also includes using the computer to fit a first moment curve to the plurality of plotted moments at the plurality of conditions, evaluating the first force curve and the first moment curve, and making a second tire design based on the evaluation of the first force curve and the first moment curve.

In yet another embodiment, a method of modeling a tire includes providing a first virtual tire on a computer, the first virtual tire having a first tire design and rotating the first virtual tire at a first speed. The method further includes measuring a plurality of virtual forces on the first virtual tire while the first virtual tire rotates at the first speed under a plurality of virtual vertical loads and at a plurality of conditions. The plurality of conditions is selected from the group consisting of a plurality of inclination angles including at least one negative inclination angle and at least one positive inclination angle, a plurality of slip angles including at least one negative slip angle and at least one positive slip angle, and a plurality of longitudinal slip ratios including at least one negative longitudinal slip ratio and at least one positive longitudinal slip ratio. The method also includes using a computer to plot the plurality of virtual forces against the plurality of conditions at the plurality of virtual vertical loads and using the computer to fit a plurality of curves to the plurality of plotted forces at the plurality of conditions, with each of the plurality of curves representing a force curve for the first virtual tire under a selected virtual vertical load. The method also includes evaluating the plurality of curves and, based on the evaluation of the plurality of curves, selecting between the steps of producing a physical tire having the first tire design, and making a second virtual tire having a second tire design.

In still another embodiment, a method of modeling a tire includes providing a plurality of reference curves, each reference curve representing the distribution of at least one of a force and a moment on a tire over a range of conditions selected from the group consisting of slip angles, inclination angles, and longitudinal slip ratios. The method further includes providing a tire, rotating the tire, and measuring a selected number of forces on the tire while the tire rotates under a vertical load at a selected number of conditions. The method also includes using a computer to plot the selected number of forces against the selected number of conditions and selecting a first reference curve from the plurality of reference curves. The method further includes using the computer to perform at least one operation on the first reference curve to produce a new curve and storing the new curve on a physical medium.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples or forms of components that fall within the scope of a term and that may be used for implementation. The examples are not intended to be limiting. Both singular and plural forms of terms may be within the definitions.

"Equatorial plane" refers to the plane that is perpendicular to the tire's axis of rotation and passes through the center of the tire's tread.

"Inclination angle" refers to the angle between a vertical line and the equatorial plane of the tire.

"Slip angle" refers to the angle between a rolling tire's direction of travel and the equatorial plane of the wheel.

"Tread" refers to that portion of the tire that comes into contact with the road under normal inflation and load.

Figure 1:
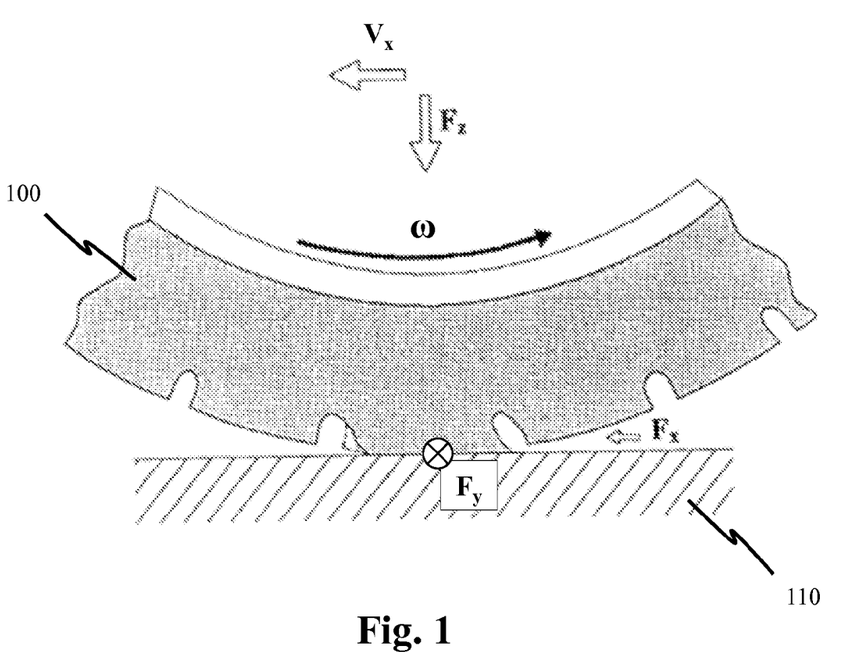
FIG. 1 is a schematic drawing of a tire rolling on a rolling surface.

FIG. 1 is a schematic drawing illustrating a side view of a tire 100 rolling on a rolling surface 110. When the tire 100 is in use, it receives a vertical load $F_z$ from a vehicle (not shown) and any cargo (not shown). In this drawing, the tire 100 has a rotational velocity ω in the counterclockwise direction that causes the tire to move to the left of the page with a linear velocity $V_x$. As the tire rotates, the rolling surface 100 exerts a longitudinal force $F_x$ on the tire 100 in the direction of travel. The rolling surface 110 also exerts a vertical force opposite to the vertical load $F_z$ and a lateral force Fy that is normal to the vertical force and to the longitudinal force $F_x$. The lateral force $F_y$ may also be referred to as cornering force $F_y$. Cornering force $F_y$ is generated by tire slip.

The relationship between cornering force $F_y$ and the slip angle contributes to the handling of a vehicle. This relationship is a factor that may be considered during the designing of a tire. For that reason, it may be desirable to measure cornering force $F_y$ as a function of slip angle. It may also be desirable to measure cornering force Fy as a function of the inclination angle or longitudinal slip ratio.

It may also be desirable to measure the longitudinal force $F_x$ as a function of the slip angle. Likewise, it may be desirable to measure the longitudinal force $F_x$ as a function of the inclination angle or longitudinal slip ratio.

The forces on the tire create moments, including aligning torque $M_z$. Aligning torque $M_z$ is the torque about a vertical axis that a tire creates as it rolls, and its magnitude is generally understood to be the product of the lateral force $F_y$ generated at the contact patch of the tire and the distance behind the wheel center at which the lateral force $F_y$ acts.

The relationship between aligning torque $M_z$ and the inclination angle also contributes to the handling of a vehicle. This relationship is also a factor that may be considered during the designing of a tire. For that reason, it may be desirable to measure aligning torque $M_z$ as a function of slip angle. It may also be desirable to measure aligning torque $M_z$ as a function of the inclination angle or longitudinal slip ratio.

It may also be desirable to measure the driving/braking moment $M_y$ as a function of the slip angle. Likewise, it may be desirable to measure the driving/braking moment $M_y$ as a function of the inclination angle or longitudinal slip ratio.

It may also be desirable to measure the overturning moment $M_x$ as a function of the slip angle. Likewise, it may be desirable to measure the overturning moment $M_x$ as a function of the inclination angle or longitudinal slip ratio.

In one embodiment, tire force and moment models are created for evaluation of a tire during a tire design process. After the models are created, they may be evaluated against design targets or as part of an iterative process. The tire design may be adjusted based on the evaluation, and new force and moment models are created for tire evaluation. The process is repeated until a preferred tire design is identified. It should be understood that the data from the force and moment models comprise only one set of factors that may be considered during the tire design process. Additional factors include, without limitation, noise, rolling resistance, wet traction, snow traction, and other performance considerations. The relative importance of each factor may vary according to the type of tire, the target customer, or other considerations.

A tire designing and manufacturing process may include the creation of force and moment models with the method described herein. In this method, a first tire having a first tire design is provided. In one embodiment, the first tire is a symmetric tire. In an alternative embodiment, the first tire is an asymmetric tire.

Although the tire is referred to as a "first tire," this designation is merely used for convenience. Because the process may be iterative, the process cycle may be repeated multiple times. While the description of the process cycle may reflect a first run of the cycle, where the "first tire" is an initial tire that is being tested, it may be equally applicable to a cycle that has been repeated many times, where the "first tire" is the $n^{th}$ tire that is being tested. The first tire design may represent a new tire design that has not yet been tested for handling or other performance characteristics. Alternatively, the first tire design may be a revised tire design that incorporates changes to a new tire design based on prior testing. In another alternative embodiment, the tire design may be an existing tire design, which a designer wishes to modify.

In one embodiment, the first tire is a physical tire, and the testing and measuring are physically performed. In an alternative embodiment, the first tire is a computer model of a tire, or a "virtual tire." In such an embodiment, the testing and measuring are performed virtually by computer simulation. It should be understood that the steps described below may be performed either physically or virtually, unless a step is expressly described as being limited to a physical step or a virtual step. It should also be understood that virtual steps are performed by a computer or other machine, unless a virtual step is described as encompassing a mental step.

After the first tire is provided, it is rotated at a selected speed while engaging a rolling surface. For example, the first tire may be rotated on a belt or one or more rollers. Alternatively, rotation of the first tire may be simulated by a computer or other machine. In one embodiment, all of the measuring and testing described below is performed while the first tire is rotated at a single selected speed. In an alternative embodiment, the first tire may be rotated at a plurality of different speeds.

While the first tire is rotated, a first vertical load is applied to the first tire. As the first vertical load is applied, the first tire is moved through a plurality of selected slip angles and a first set of force measurements is taken. In one embodiment, the plurality of selected slip angles includes at least one negative slip angle and at least one positive slip angle. The first set of force measurements includes a force that is measured for each of the plurality of selected slip angles. In one embodiment, a lateral force $F_y$ or cornering force is measured. In an alternative embodiment, a longitudinal force $F_x$ is measured. In another alternative embodiment, both a lateral force $F_y$ and a longitudinal force $F_x$ is measured.

In an alternative embodiment, a load sweep may be applied instead of a first vertical load. In other words, the load may vary as the first tire is moved through a plurality of selected slip angles.

Additionally, or in the alternative, the first tire may be moved through a plurality of inclination angles or through a plurality of longitudinal slip ratios while a longitudinal force $F_x$ or lateral force $F_y$ is measured.

The selected angles (and/or ratios) and the first set of force measurements are stored in a computer. For example, the selected angles (and/or ratios) and the first set of force measurements may be stored in a lookup table in a computer database.

In one embodiment, a user may only desire to test the first tire under the first vertical load. In alternative embodiments, a user may desire to test the first tire under a plurality of different vertical loads. In such an embodiment, while the first tire is rotated, a second vertical load is applied. While the second vertical load is applied, the first tire is moved through a plurality of selected angles (and/or ratios) and a second set of force measurements is taken. As with the first set of force measurements, the plurality of selected angles (and/or ratios) includes at least one negative angle (and/or ratios) and at least one positive angle (and/or ratios). In one embodiment, the plurality of selected angles (and/or ratios) used for the second set of force measurements are the same angles (and/or ratios) that were used for the first set of force measurements. In an alternative embodiment, different angles (and/or ratios) may be employed.

In an alternative embodiment, a second load sweep may be applied instead of the second vertical load. In other words, the load may vary as the first tire is moved through a plurality of selected slip angles.

The second set of force measurements includes a force that is measured for each of the plurality of selected angles (and/or ratios). In one embodiment, a lateral force or cornering force is measured. In an alternative embodiment, a longitudinal force $F_x$ is measured. In another alternative embodiment, both a lateral force $F_y$ and a longitudinal force $F_x$ is measured. The selected angles (and/or ratios) and the second set of force measurements are also stored in the computer.

The process may then be repeated for any number of vertical loads, or load sweeps. Each set of measurements is stored in the computer.

After the measurements have been taken, a computer plots the first set of force measurements against the plurality of angles (and/or ratios). Likewise, the computer plots the second set, and any subsequent sets of force measurements against the plurality of angles (and/or ratios). The data for each of the vertical loads may be plotted on a separate graph, or they may be overlaid on the same graph. It should be understood that the plotting may be performed after all of the measurements have been taken, or the plotting and measuring may be performed at the same time.

The computer fits a first force curve to the plotted points corresponding to the first set of force measurements. In one embodiment, the computer creates the first force curve by spline fitting the plotted points. A spline fit consists of individual polynomial curve fits that have been assembled such that the connections are smooth. A spline fit does not assume a particular shape for the force curve, but merely provides the best fit. Furthermore, because of the smoothness requirements of spline fits, these spline fits are often used to remove or minimize noise and discontinuities from data. Typically, a tire will not have a zero measured force at an angle (or ratio) of zero. Accordingly, in most instances the first force curve will have a non-zero force at an angle (or ratio) of zero. Likewise, the first force curve will have a non-zero angle (or ratio) at a force of zero. However, it should be understood that the first force curve may have a zero force at an angle (or ratio) of zero.

Typically, the first force curve will be asymmetric. However, it should be understood that the first force curve may be symmetric.

The computer fits additional curves to each of the additional sets of measurements. As with the first force curve, in most instances, each of the additional curves will have a non-zero force at an angle (or ratio) of zero, and a non-zero angle (or ratio) at a force of zero. Typically, the additional curves will be asymmetric. However, it should be understood that the additional curves may have a zero force at an angle (or ratio) of zero. Further, the additional curves may be symmetric.

The first force curve and any additional force curves are stored on a physical medium. For example, the first force curve and any additional force curves may be printed on paper or stored in a physical memory.

The first force curve and any additional force curves are then evaluated. The evaluator may determine whether it is desirable to have different cornering forces (or longitudinal forces) at one or more of the slip angles, inclination angles, or longitudinal slip ratios in any of the force curves. The evaluator may be a human evaluator or a machine. For example, the evaluator may select a design having a desired cornering stiffness. The evaluator may evaluate the slope of the force curve at various locations, such as at the y-axis of the force curve. In some instances, a steeper slope may be preferable, while in other instances, a shallower slope is preferred. The evaluator may also consider the peak measured force and/or the load dependence of the peak measured force. The evaluator may also evaluate the saturation region (i.e., the area near the outer bounds of the force curve), and determine the slope in that region. The evaluation of measured forces at various slip angles, inclination angles, or longitudinal slip ratios under various loads may also be balanced against an evaluation of other factors that were tested or otherwise considered on the first tire.

After the evaluation, if the first tire design is deemed to be acceptable, the first tire may be manufactured. Alternatively, if the evaluator determines that it is desirable to make changes to the first tire design, a second tire design is created. A second tire having the second tire design is then produced. As with the first tire, the second tire may be a physical tire or a virtual tire. The process may be repeated until an acceptable design is produced.

In addition to, or instead of the force measurements and evaluations described above, moments or torques may also be measured on the first tire. Torque may be measured directly, or the torque may be determined by measuring a force and calculating the torque based on the force and an associated displacement. It should be understood that the description of measuring torque below encompasses both direct and indirect measurements. The torque measurements may be done at the same time as the force measurements described above, or they may be performed in a separate test.

In one embodiment, while the first tire is rotated and the first vertical load or load sweep is applied, the first tire is moved through a plurality of selected inclination angles and a first set of torque measurements is taken. In one embodiment, the plurality of selected inclination angles includes at least one negative inclination angle and at least one positive inclination angle. The first set of torque measurements includes a moment that is measured for each of the plurality of selected inclination angles. In one embodiment, an aligning torque $M_z$ is measured. In an alternative embodiment, a driving/braking moment $M_y$ is measured. In another alternative embodiment, an overturning moment $M_x$ is measured. In yet another alternative embodiment, any combination of aligning torque $M_z$, driving/braking moment $M_y$, and overturning moment $M_x$ is measured.

The selected inclination angles and the first set of torque measurements are stored in a computer. For example, the selected inclination angles and the first set of torque measurements may be stored in a lookup table in a computer database.

Alternatively, or in addition to the plurality of selected inclination angles, the tire may be moved through a plurality of selected slip angles and/or a plurality of selected longitudinal slip ratios.

In one embodiment, a user may only desire to test the first tire under the first vertical load. In alternative embodiments, the user may desire to test the first tire under a plurality of vertical loads. In such an embodiment, while the first tire is rotated, a second vertical load or load sweep is applied. While the second vertical load is applied, the first tire is moved through a plurality of selected angles (and/or ratios) and a second set of torque measurements is taken. As with the first set of torque measurements, the plurality of selected angles (and/or ratios) includes at least one negative angle (or ratio) and at least one positive angle (or ratio). In one embodiment, the plurality of selected angles (and/or ratios) used for the second set of torque measurements are the same angles (and/or ratios) that were used for the first set of torque measurements. In an alternative embodiment, different angles (and/or ratios) may be employed.

The second set of torque measurements includes a moment that is measured for each of the plurality of selected angles (and/or ratios). In one embodiment, an aligning torque is measured. The selected angles (and/or ratios) and the second set of torque measurements are also stored in the computer.

The process may then be repeated for any number of vertical loads or load sweeps. Each set of torque measurements is stored in the computer.

After the torque measurements have been taken, a computer plots the first set of torque measurements against the plurality of angles (and/or ratios). Likewise, the computer plots the second set, and any subsequent sets of torque measurements against the plurality of angles (and/or ratios). The data for each of the vertical loads may be plotted on a separate graph, or they may be overlaid on the same graph. It should be understood that the plotting may be performed after all of the measurements have been taken, or the plotting and measuring may be performed at the same time.

The computer fits a first moment curve to the plotted points corresponding to the first set of torque measurements. In one embodiment, the computer creates the first moment curve by spline fitting the plotted points. The computer fits additional moment curves to each additional set of torque measurements.

The first moment curve and any additional moment curves are stored on a physical medium. For example, the first moment curve and any additional moment curves may be printed on paper or stored in a physical memory.

The first moment curve and any additional moment curves are then evaluated. The evaluator may determine whether it is desirable to have different aligning torques at one or more of the angles (and/or ratios) in any of the moment curves. The evaluator may be a human evaluator or a machine. For example, the evaluator may evaluate the slope of the moment curve at various locations, such as at the y-axis of the moment curve. It some instances, a steeper slope may be preferable, while in other instances, a shallower slope is preferred. The evaluator may also consider the peak measured moment and/or the load dependence of the peak measured moment. The evaluator may also evaluate the saturation region (i.e., the area near the outer bounds of the force curve), and determine the slope in that region. The evaluation of aligning torques at various angles (and/or ratios) under various loads may also be balanced against an evaluation of other factors that were tested or otherwise considered on the first tire, including, without limitation, the evaluation of force curves described above.

After the evaluation, if the first tire design is deemed to be acceptable, the first tire may be manufactured. Alternatively, if the evaluator determines that it is desirable to make changes to the first tire design, a second tire design is created. A second tire having the second tire design is then produced. As with the first tire, the second tire may be a physical tire or a virtual tire. The process may be repeated until an acceptable tire is produced.

The following examples, while not intended to be limiting, may be instructive of the above-described method. In these examples, the $F_y$ and $M_z$ measurements are described as separate tests. However, it should be understood that these can either be done separately or together. In practice, $F_y$ and $M_z$ are commonly measured at the same time in both physical tests and virtual tests for efficiency.

EXAMPLE 1

In a first example, a first tire is provided and rotated at a desired speed. The first tire is tested under vertical loads of 1300 N, 3500 N, 5000 N, and 6900 N. Under each vertical load, the slip angle of the tire is adjusted from −19.8° to 19.8°, and the lateral force is measured at each increment. A first lookup table is populated, a portion of which is shown below as Table 1.

TABLE 1

| Slip Angle | Vertical Loads (N) | | | | |
|---|---|---|---|---|---|
| (°) | 1300 | 3500 | 5000 | 6900 | |
| −19.8 | 1316.891 | 2886.773 | 4090.713 | 5222.672 | Lateral Force |
| −19.7 | 1317.323 | 2901.051 | 4100.798 | 5239.472 | $F_y$ (N) |
| −19.6 | 1317.793 | 2914.618 | 4110.307 | 5255.175 | |
| −19.5 | 1318.301 | 2927.507 | 4119.275 | 5269.843 | |
| −19.4 | 1318.843 | 2939.749 | 4127.735 | 5283.539 | |
| −19.3 | 1319.418 | 2951.374 | 4135.719 | 5296.322 | |
| −19.2 | 1320.027 | 2962.414 | 4143.261 | 5308.251 | |
| −19.1 | 1320.666 | 2972.897 | 4150.390 | 5319.381 | |
| −19.0 | 1321.334 | 2982.853 | 4157.138 | 5329.766 | |
| −18.9 | 1322.031 | 2992.308 | 4163.532 | 5339.461 | |
| −18.8 | 1322.755 | 3001.290 | 4169.602 | 5348.515 | |
| −18.7 | 1323.504 | 3009.826 | 4175.375 | 5357.979 | |
| −18.6 | 1324.277 | 3017.940 | 4180.877 | 5364.900 | |
| −18.5 | 1325.074 | 3025.658 | 4186.134 | 5372.324 | |
| −18.4 | 1325.892 | 3033.004 | 4191.170 | 5379.296 | |
| −18.3 | 1326.730 | 3040.001 | 4196.009 | 5385.859 | |
| −18.2 | 1327.587 | 3046.671 | 4200.675 | 5392.055 | |
| −18.1 | 1328.462 | 3053.037 | 4205.190 | 5397.922 | |
| −18.0 | 1329.354 | 3059.12 | 4209.573 | 5403.500 | |

While only a portion of the table is shown here, it should be understood that the complete lookup table also includes entries for each of the remaining slip angles between −17.9° and 19.8° in 0.1° increments. It should be further understood that the lookup table may include entries in increments greater than or less than 0.1°. Additionally, the increments may be irregular. The values in the table may be measurements at each slip angle or values from interpolation of those measurements.

Figure 2:
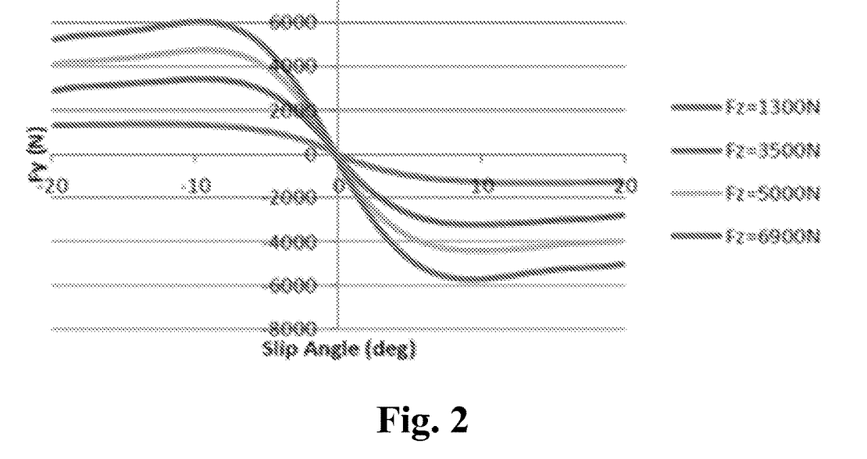
FIG. 2 is a first exemplary force diagram illustrating a lateral force against a slip angle for a plurality of vertical loads.

A computer plots each of the points from Table 1 on a graph to produce the force curves shown in FIG. 2. A spline fit can be performed on the values of the lookup table to produce the curves. Alternatively, a spline fit can be performed first to generate the values in the lookup table. In the illustrated embodiment, each of the force curves pass near the origin, but do not actually pass through the origin. In other words, each force curve has a non-zero cornering force at a slip angle of zero, and a non-zero slip angle at a cornering force of zero. In the illustrated embodiment, the force curves are asymmetric. In alternative embodiments, the force curves may be symmetric.

Additionally, as the vertical loads of 1300 N, 3500 N, 5000 N, and 6900 N are applied, a plurality of inclination angles are applied, and the lateral force is measured at each increment. A second lookup table is populated, as shown below as Table 2, which can contain either measurements performed at those inclination angles or interpolated values at those inclination angles.

TABLE 2

| Inclination Angle | Vertical Loads (N) | | | | |
|---|---|---|---|---|---|
| (°) | 1300 | 3500 | 5000 | 6900 | |
| −3 | 40.8155 | 120.4772 | 234.0643 | 242.7356 | $F_y$ (N) |
| 0 | 0 | 0 | 0 | 0 | |
| 3 | −67.9851 | −173.487 | −279.56 | −374.405 | |

Figure 3:
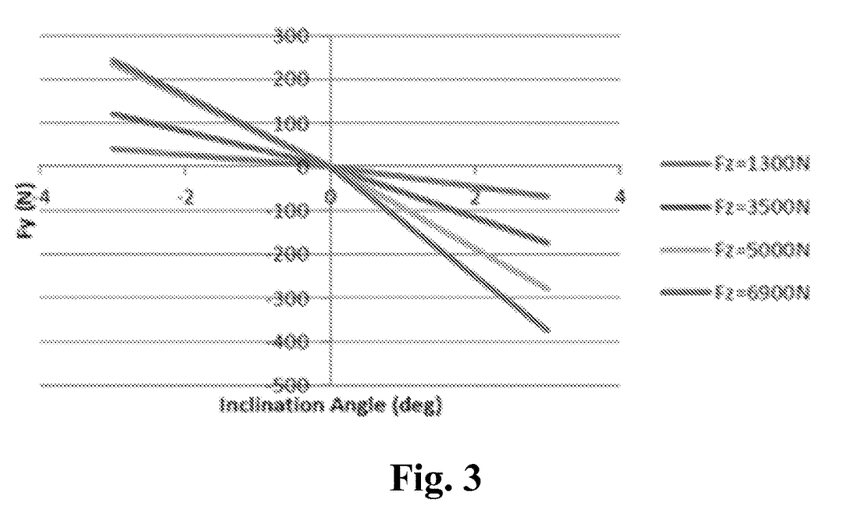
FIG. 3 is a first exemplary force diagram illustrating a lateral force against an inclination angle for a plurality of vertical loads.

A computer plots each of the points from Table 2 on a graph to produce the force curves shown in FIG. 3. As with FIG. 2, a spline fit can be performed on the values of the lookup table to produce the curves. Alternatively, a spline fit can be performed first to generate the values in the lookup table. In the illustrated embodiment, the force curves are asymmetric. In an alternative embodiment, the force curves may be symmetric.

Additional forces or moments may also be measured at the longitudinal slip ratios above, or at a plurality of slip angles or inclination angles. These additional measurements may be used to create additional lookup tables or force and moment curves.

After the force curves have been generated, they are stored in a physical medium. For example, the force curves may be printed on paper or stored in a physical memory. An evaluator can then determine whether the tire design is acceptable or whether further adjustments are desired. If the tire design is acceptable, the tire may be manufactured. Otherwise, a second tire may be produced and evaluated.

EXAMPLE 2

In a second example, a second tire is provided and rotated at a desired speed. As with the first example, the second tire is tested under vertical loads of 1300 N, 3500 N, 5000 N, and 6900 N. Under each vertical load, the slip angle of the tire is adjusted from −19.8° to 19.8°, and the aligning torque is measured at each increment. A third lookup table is populated, a portion of which is shown below as Table 3. The table may contain measurements at each of those vertical loads and slip angles, or may contain interpolated values of the measured data.

TABLE 3

| Slip Angle | Vertical Loads (N) | | | | |
|---|---|---|---|---|---|
| (°) | 1300 | 3500 | 5000 | 6900 | |
| −19.8 | −0.40967 | −5.7115 | −10.8501 | −2.0017 | Aligning Torque |
| −19.7 | −0.40967 | −5.7115 | −10.8501 | −2.0017 | $M_z$ (Nm) |
| −19.6 | −0.40967 | −5.7115 | −10.8501 | −2.0017 | |
| −19.5 | −0.40967 | −5.7115 | −10.8501 | −2.0017 | |
| −19.4 | −0.40967 | −5.7115 | −10.8501 | −2.0017 | |
| −19.3 | −0.40967 | −5.7115 | −10.8501 | −2.0017 | |
| −19.2 | −0.40967 | −5.7115 | −10.8501 | −2.0017 | |
| −19.1 | −0.40967 | −5.7115 | −10.8501 | −2.0017 | |
| −19.0 | −0.40967 | −5.7115 | −10.8501 | −2.0017 | |
| −18.9 | −0.40967 | −5.7115 | −10.8501 | −2.0017 | |
| −18.8 | −0.40967 | −5.7115 | −10.8501 | −2.0017 | |
| −18.7 | −0.40967 | −5.7115 | −10.8501 | −2.0017 | |
| −18.6 | −0.40967 | −5.7115 | −10.8501 | −2.0890 | |
| −18.5 | −0.40967 | −5.7115 | −10.8501 | −2.2394 | |
| −18.4 | −0.40967 | −5.7115 | −10.8501 | −2.4453 | |
| −18.3 | −0.40967 | −5.7115 | −10.8501 | −2.6997 | |
| −18.2 | −0.40967 | −5.7115 | −10.8501 | −2.9959 | |
| −18.1 | −0.40967 | −5.7115 | −10.8501 | −3.3276 | |
| −18.0 | −0.40967 | −5.7115 | −10.8501 | −3.689 | |

While only a portion of the table is shown here, it should be understood that the complete lookup table also includes entries for each of the remaining slip angles between −19.8° and 19.8° in 0.1° increments.

Figure 4:
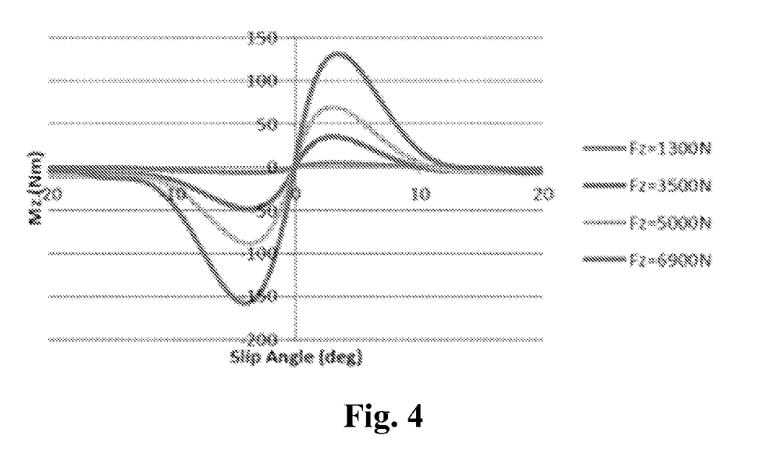
FIG. 4 is a second exemplary moment diagram illustrating an aligning torque against a slip angle for a plurality of vertical loads.

A computer plots each of the points from Table 3 on a graph to produce the moment curves shown in FIG. 4. In the illustrated embodiment, each of the moment curves pass near the origin, but do not actually pass through the origin. In other words, each moment curve has a non-zero aligning torque at a slip angle of zero, and a non-zero slip angle at an aligning torque of zero. In the illustrated embodiment, the moment curves are asymmetric. In alternative embodiments, the moment curves may be symmetric.

Additionally, as the vertical loads of 1300 N, 3500 N, 5000 N, and 6900 N are applied, the inclination angle of the tire is adjusted from −3° to 3°, and the aligning torque is measured at each increment. A fourth lookup table is populated, as shown below as Table 4. The table may contain measurements at those loads and inclination angles or interpolated values.

TABLE 4

| Inclination Angle | Vertical Loads (N) | | | | |
|---|---|---|---|---|---|
| (°) | 1300 | 3500 | 5000 | 6900 | |
| −3 | 3.8526 | 8.4139 | 6.1406 | 12.9579 | $M_z$ |
| 0 | 0 | 0 | 0 | 0 | (Nm) |
| 3 | −3.6417 | −9.1233 | −14.9868 | −13.0894 | |

Figure 5:
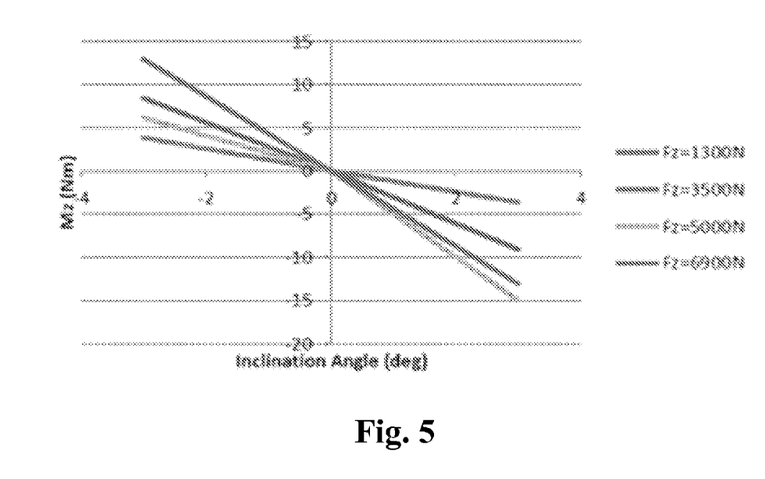
FIG. 5 is a second exemplary moment diagram illustrating an aligning torque against an inclination angle for a plurality of vertical loads.

A computer plots each of the points from Table 4 on a graph to produce the moment curves shown in FIG. 5.

Additional forces or moments may also be measured at the longitudinal slip ratios above, or at a plurality of slip angles or inclination angles. These additional measurements may be used to create additional lookup tables or force and moment curves.

After the force and moment curves have been generated, they are stored in a physical medium. For example, the force and moment curves may be printed on paper or stored in a physical memory. An evaluator can then determine whether the tire design is acceptable or whether further adjustments are desired. If the tire design is acceptable, the tire may be manufactured. Otherwise, a third tire design may be produced and evaluated.

EXAMPLE 3

In a third example, a tire is provided and rotated at a desired speed. In this example, the tire is tested under vertical loads of 2500 N, 3700 N, and 4900 N. Under each vertical load, the longitudinal slip ratio of the tire is adjusted from −0.3 to 0.3, and the longitudinal force $F_x$ is measured at each increment. A fifth lookup table is populated, a portion of which is shown below as Table 5. The table may contain measurements at each of those vertical loads and longitudinal slip ratios, or may contain interpolated values of the measured data.

TABLE 5

| Longitudinal Slip Ratio | Vertical Loads (N) | | | |
|---|---|---|---|---|
| | 2500 | 3300 | 4900 | |
| 0.298 | 2445.601 | 3454.507 | 4738.232 | Longitudinal Force ($F_x$) |
| 0.297 | 2445.579 | 3450.023 | 4738.155 | |

TABLE 5-continued

| Longitudinal Slip Ratio | Vertical Loads (N) | | |
|---|---|---|---|
| | 2500 | 3300 | 4900 |
| 0.296 | 2445.496 | 3455.55 | 4738.166 |
| 0.295 | 2445.29 | 3451.167 | 4738.407 |
| 0.294 | 2444.929 | 3437.074 | 4738.934 |
| 0.293 | 2444.43 | 3453.603 | 4739.819 |
| 0.292 | 2443.874 | 3431.129 | 4741.069 |
| 0.291 | 2443.401 | 3429.894 | 4742.608 |
| 0.290 | 2443.175 | 3429.969 | 4744.335 |
| 0.289 | 2443.349 | 3431.285 | 4746.155 |
| 0.288 | 2444.043 | 3433.668 | 4748.006 |
| 0.287 | 2445.325 | 3436.876 | 4749.848 |
| 0.286 | 2447.215 | 3440.632 | 4751.614 |
| 0.285 | 2449.672 | 3444.641 | 4753.17 |

While only a portion of the table is shown here, it should be understood that the complete lookup table also includes entries for each of the remaining longitudinal slip ratios between 0.3 and −0.3 in increments of 0.001.

Additional forces or moments may also be measured at the longitudinal slip ratios above, or at a plurality of slip angles or inclination angles. These additional measurements may be used to create additional lookup tables or force and moment curves.

Figure 6:
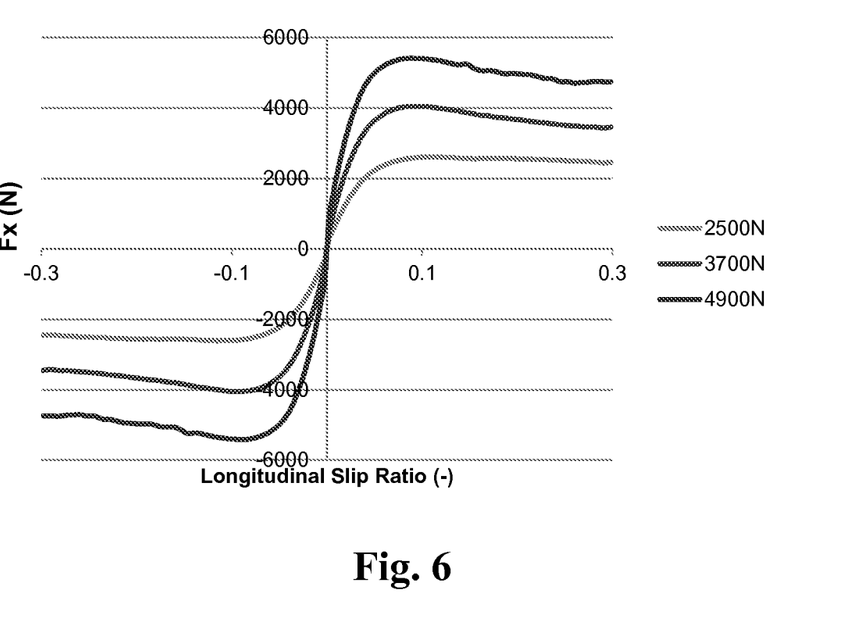
FIG. 6 is another exemplary force diagram illustrating a longitudinal force against a longitudinal slip ratio.

A computer plots each of the points from Table 5 on a graph to produce the force curves shown in FIG. 6. In the illustrated embodiment, each of the force curves pass near the origin, but do not actually pass through the origin. In other words, each force curve has a non-zero longitudinal force at a longitudinal slip ratio of zero, and a non-zero longitudinal slip ratio at a longitudinal force of zero.

After the force curve has been generated, it is stored in a physical medium. For example, the force curve may be printed on paper or stored in a physical memory. An evaluator can then determine whether the tire design is acceptable or whether further adjustments are desired. If the tire design is acceptable, the tire may be manufactured. Otherwise, another tire design may be produced and evaluated.

Figure 7:
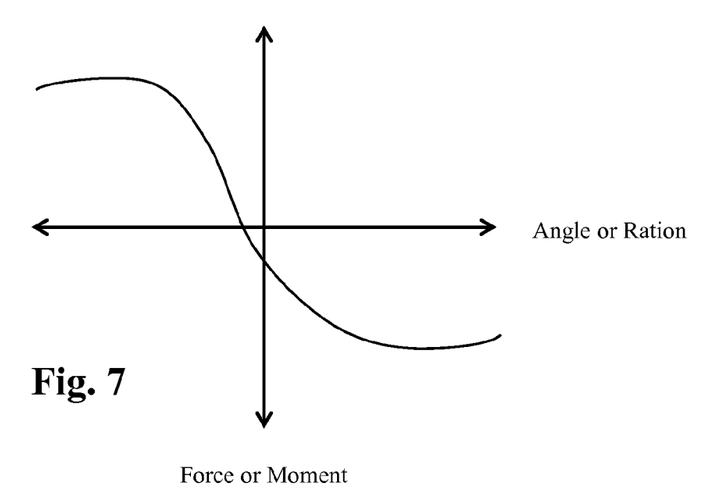
FIG. 7 is a diagram of an exemplary reference curve.

While the above described embodiments involve multiple measurements at numerous slip angles, the number of measurements may be reduced substantially by relying on a reference tire. In one embodiment, force and moment curves are created for a reference tire using a method described above, or any other known method. These force and moment curves may be known as reference curves. An exemplary reference curve is shown in FIG. 7. In one embodiment, measurements are taken for a plurality of reference tires, and the reference curves are stored in a reference library.

The reference curves may compare the following: (1) longitudinal force $F_x$ vs. slip angle; (2) lateral force $F_y$ vs. slip angle; (3) overturning moment $M_x$ vs. slip angle; (4) driving/braking moment $M_y$ vs. slip angle; (5) aligning moment $M_z$ vs. slip angle; (6) longitudinal force $F_x$ vs. longitudinal slip ratio; (7) lateral force $F_y$ vs. longitudinal slip ratio; (8) overturning moment $M_x$ vs. longitudinal slip ratio; (9) driving/braking moment $M_y$ vs. longitudinal slip ratio; (10) aligning moment $M_z$ vs. longitudinal slip ratio; (11) longitudinal force $F_x$ vs. inclination angle; (12) lateral force $F_y$ vs. inclination angle; (13) overturning moment $M_x$ vs. inclination angle; (14) driving/braking moment $M_y$ vs. inclination angle; or (6) aligning torque $M_z$ vs. inclination angle. However, it should be understood that the reference curves may compare any force or moment to any physical condition of the tire.

After the reference curve has been made, a new tire having a new tire design is provided. However, the new tire has features in common with the reference tire, such that the force and moment curves would be expected to share common characteristics.

In one embodiment, the new tire is a physical tire, and the testing and measuring are physically performed. In an alternative embodiment, the new tire is a computer model of a tire, or a "virtual tire." In such an embodiment, the testing and measuring are virtually performed by computer simulation. It should be understood that the steps described below may be performed either physically or virtually, unless a step is expressly described as being limited to a physical step or a virtual step. It should also be understood that virtual steps are performed by a computer or other machine, unless a virtual step is described as encompassing a mental step.

After the new tire is provided, it is rotated at a selected speed while engaging a rolling surface, such as in one of the manners described above. While the new tire is rotated, a first vertical load is applied to the first tire. As the first vertical load is applied, the new tire is moved through a limited number of selected slip angles and a set of force measurements is taken. In one embodiment, force measurements are taken at five different slip angles. In alternative embodiments, force measurements are taken at two, three, or four different slip angles. In another alternative embodiment, force measurements are taken at more than five different slip angles.

Figure 8:
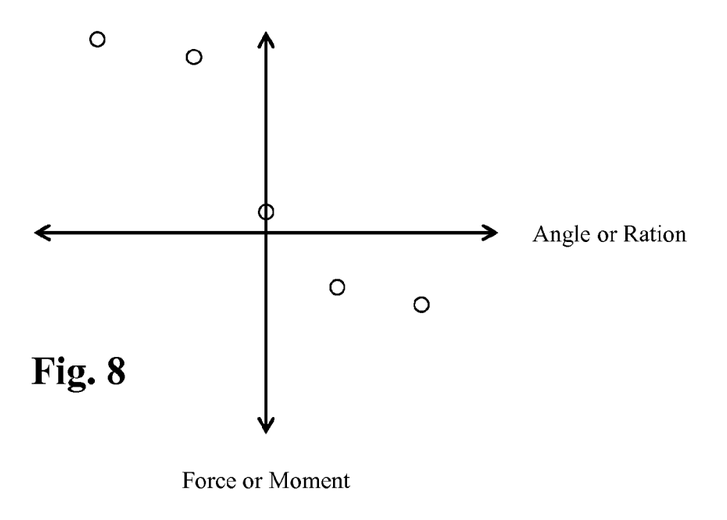
FIG. 8 is a diagram of plotted points of exemplary measurements of a new tire.
Figure 9:
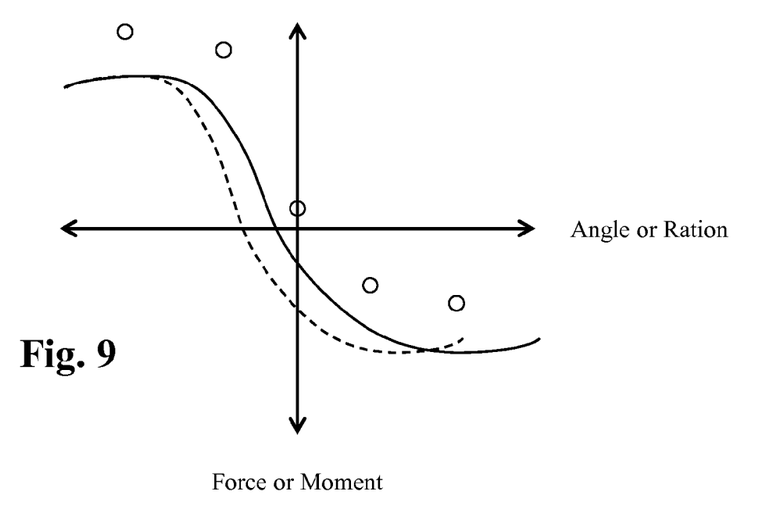
FIG. 9 is a diagram of the plotted points of FIG. 8 with the reference curve of FIG. 7, where the reference curve is scaled in an X direction.

In one embodiment, a lateral force or cornering force is measured. The selected slip angles and the first set of force measurements are stored in a computer. For example, the selected slip angles and the first set of force measurements may be stored in a lookup table in a computer database. The slip angles and measured forces are then plotted. FIG. 8 illustrates an exemplary plot of measured forces at selected slip angles. In this example, five points have been plotted. However, it should be understood that any number of points may be plotted After the points are plotted, the selected reference curve is overlaid, as shown in FIG. 9. The selected reference curve is then shifted and scaled to fit the plotted points. For example, the least squares method may be employed on the reference curve to fit the plotted points.

Figure 10:
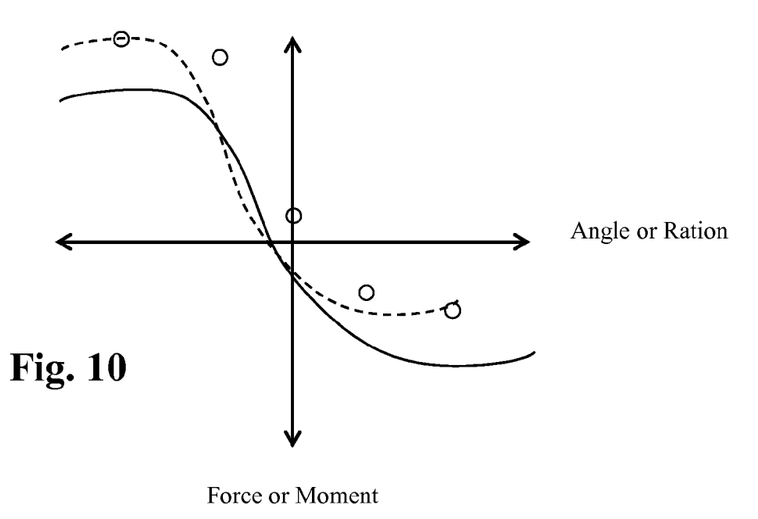
FIG. 10 is a diagram of the plotted points of FIG. 8 with the reference curve of FIG. 7, where the scaled reference curve is shifted curve in a Y direction.
Figure 11:
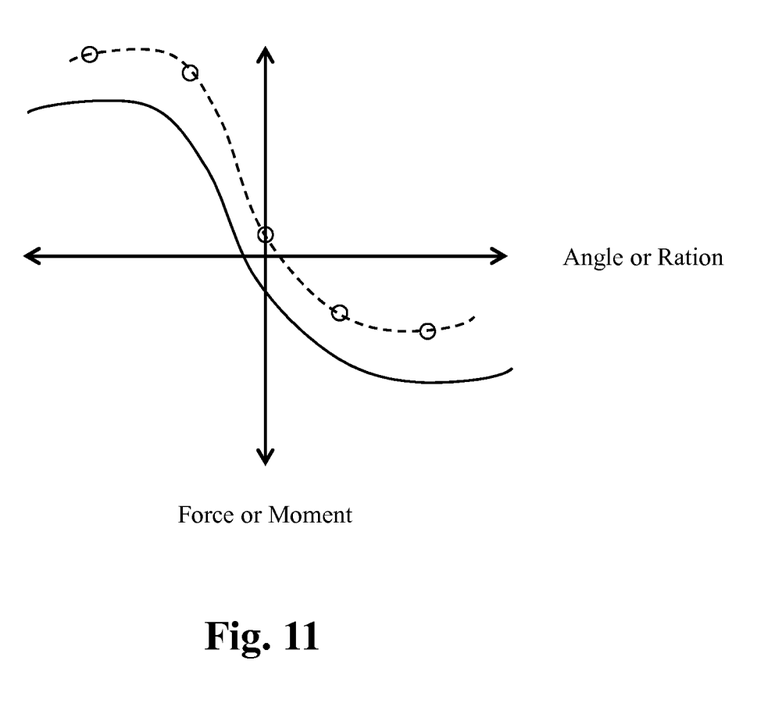
FIG. 11 is a diagram of the plotted points of FIG. 8 with the reference curve of FIG. 7 where the scaled and shifted reference curve is further shifted in an X direction.

In the illustrated example, the reference curve is scaled in the X direction as shown in FIG. 9. The scaled reference curve is then shifted in the Y direction as shown in FIG. 10. Finally, the scaled and shifted reference curve is then shifted in the X direction as shown in FIG. 11 to fit the plotted points. It should be understood that in alternative embodiments, the reference curve may be shifted and/or scaled in the in X direction in addition or in the alternative to the Y direction shifting and scaling. For example, in one embodiment, only shifting in the Y direction may be required. In an alternative embodiment, only scaling in the Y direction may be required. In another alternative embodiment, only shifting in the X direction may be required. In yet another alternative embodiment, only scaling in the X direction may be required. It should be understood that any combination of scaling and shifting may be employed.

After the new curve is produced, the new curve is stored on a physical medium. For example, the new curve may be printed to paper, or stored in a physical memory.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A method of manufacturing a tire comprising:
   providing a first tire having a first tire design;
   rotating the first tire at a first speed under a first selected vertical load;
   measuring a first plurality of forces, including at least one force on the first tire at each of a plurality of selected conditions while the first tire rotates at the first speed under the first selected vertical load, wherein the plurality of selected conditions is selected from the group consisting of a plurality of selected slip angles, a plurality of selected inclination angles, and a plurality of selected longitudinal slip ratios;
   using a computer to plot the first plurality of forces against the plurality of selected conditions;
   using the computer to fit a first force curve to the first plurality of plotted forces at the plurality of selected conditions;
   rotating the first tire at the first speed under a second selected vertical load;
   measuring a second plurality of forces, including at least one force on the first tire at each of the plurality of selected conditions while the first tire rotates at the first speed under the second selected vertical load;
   using the computer to plot the second plurality of forces against the plurality of selected conditions;
   using the computer to fit a second force curve to the second plurality of plotted forces at the plurality of selected conditions;
   adjusting the first force curve and the second force curve to make a first revised force curve and a second revised force curve,
      wherein the adjusting the first force curve includes making the first revised force curve by changing at least one of a slope and a peak of the first force curve, without repeating any of the steps of rotating the first tire at a first speed under a first selected vertical load, or measuring the first plurality of forces, and
      wherein the adjusting the second force curve includes making the second revised force curve by changing at least one of a slope and a peak of the second force curve, without repeating any of the steps of rotating the first tire at a first speed under a second selected vertical load, or measuring the second plurality of forces;
making a second tire design based on the first revised force curve and the second revised force curve; and
making a second tire having the second tire design, wherein the making the second tire includes making at least one physical tire having the second tire design.

2. The method of claim 1, wherein the providing the first tire includes providing a physical tire having the first tire design.

3. The method of claim 1, wherein the providing the first tire includes using the computer to provide a virtual tire.

4. The method of claim 1, wherein the first force curve does not pass through the origin, and the second curve does not pass through the origin.

5. The method of claim 1, wherein the providing the first tire having the first tire design includes making the first tire design based on an evaluation of force curves of a prior tire design.

6. The method of claim 1, further comprising:
rotating the second tire at the first speed under the first selected vertical load;
measuring a third plurality of forces, including at least one force on the second tire at each of the plurality of selected conditions while the second tire rotates at the first speed under the first selected vertical load;
using the computer to plot the third plurality of forces against the plurality of selected conditions;
using the computer to fit a third force curve to the third plurality of plotted forces at the plurality of selected conditions.

7. The method of claim 1, further comprising:
determining a first plurality of moments, including at least one moment on the first tire at each of the plurality of selected conditions while the first tire rotates at the first speed under the first selected vertical load;
using the computer to plot the first plurality of moments against the plurality of selected conditions;
using the computer to fit a first moment curve to the first plurality of plotted moments at the plurality of selected conditions; and
adjusting the first moment curve.

8. The method of claim 7, wherein the making the second tire design includes making the second tire design based on the adjusting of a plurality of force and moment curves from the first tire design.

9. A method of modeling a tire comprising:
providing a tire having a first tire design;
rotating the tire under a vertical load;
measuring a plurality of forces, including at least one force on the tire at each of a plurality of selected conditions while the tire rotates under the vertical load;
determining a plurality of moments, including at least one moment on the tire at each of the plurality of selected conditions while the tire rotates under the vertical load, wherein the plurality of conditions is selected from the group consisting of a plurality of inclination angles including at least one negative inclination angle and at least one positive inclination angle, a plurality of slip angles including at least one negative slip angle and at least one positive slip angle, and a plurality of longitudinal slip ratios including at least one negative longitudinal slip ratio and at least one positive longitudinal slip ratio;
using a computer to plot the plurality of forces against the plurality of conditions;
using the computer to plot the plurality of moments against the plurality of conditions;
using the computer to fit a first force curve to the plurality of plotted forces at the plurality of conditions, such that the first force curve is asymmetric;
using the computer to fit a first moment curve to the plurality of plotted moments at the plurality of conditions;
making a second force curve by changing at least one of a slope and a peak of the first force curve, without repeating any of the steps of rotating the tire under a vertical load, or measuring a plurality of forces;
making a second moment curve by changing at least one of a slope and a peak of the first moment curve, without repeating any of the steps of rotating the tire under a vertical load, measuring a plurality of forces, or determining a plurality of moments; and
making a second tire design based on the changes to the first force curve and the first moment curve.

10. The method of claim 9, wherein the vertical load is a constant load.

11. The method of claim 9, wherein the vertical load varies as the tire rotates.

12. The method of claim 9, wherein the tire is a physical tire.

13. The method of claim 9, wherein the tire is an asymmetric tire.

14. The method of claim 9, wherein the tire is a symmetric tire.

15. The method of claim 9, further comprising:
providing a second tire having the second tire design;
rotating the second tire under the vertical load;
measuring a second plurality of forces, including at least one force on the second tire at each of the plurality of selected conditions while the second tire rotates under the vertical load;
determining a second plurality of moments, including at least one moment on the second tire at each of the plurality of selected conditions while the second tire rotates under the vertical load;
using the computer to plot the second plurality of forces against the plurality of conditions;
using the computer to plot the second plurality of moments against the plurality of conditions;
using the computer to fit a second force curve to the second plurality of plotted forces at the plurality of conditions, such that the second force curve is asymmetric;
using the computer to fit a second moment curve to the second plurality of plotted moments at the plurality of conditions; and
adjusting the second force curve and the second moment curve.

16. The method of claim 9, wherein the step of adjusting the first force curve includes changing at least one of a slope and a peak of the first force curve to make a first revised force curve, and wherein the step of adjusting the first moment curve includes changing at least one of a slope and a peak of the first moment curve to make a first revised moment curve.

17. The method of claim 9, wherein the step of using the computer to plot the plurality of forces against the plurality of conditions includes using the computer to plot no more than twenty points, and wherein the step of using the computer to plot the plurality of moments against the plurality of conditions includes using the computer to plot no more than twenty points.

18. The method of claim 1, wherein the step of using the computer to fit the first force curve to the first plurality of plotted forces at the plurality of selected conditions includes using the computer to fit the first force curve to the first plurality of plotted forces such that the first force curve is asymmetric.

19. The method of claim 18, wherein the step of using the computer to fit the second force curve to the second plurality of plotted forces at the plurality of selected conditions includes using the computer to fit the second force curve to the second plurality of plotted forces such that the second force curve is asymmetric.

20. The method of claim 1, wherein the step of using the computer to plot the first plurality of forces against the plurality of selected conditions includes using the computer to plot no more than twenty points, and the step of using the computer to plot the second plurality of forces against the plurality of selected conditions includes using the computer to plot no more twenty five points.

* * * * *